United States Patent
Kubik et al.

(10) Patent No.: US 6,848,467 B1
(45) Date of Patent: Feb. 1, 2005

(54) NON-METALLIC, SNAP-TOGETHER SUBSASEMBLY OF INTERNAL DOUBLE CHECK VALVE

(75) Inventors: James M. Kubik, Avon Lake, OH (US); Carolyn S. Dute, Spencer, OH (US)

(73) Assignee: Bendix Commercial Vehicle Systems LLC

(*) Notice: Subject to any disclaimer, the term of this patent is extended or adjusted under 35 U.S.C. 154(b) by 0 days.

(21) Appl. No.: 09/435,570

(22) Filed: Nov. 8, 1999

(51) Int. Cl.⁷ .......................... F16K 15/02; F16K 51/00
(52) U.S. Cl. ..................... 137/315.33; 137/15.18; 137/315.27; 137/454.2; 137/512; 137/540; 137/613; 137/614.2
(58) Field of Search ................ 137/15.17, 15.18, 137/102, 107, 315.27, 315.33, 512, 454.2, 540; 303/22.2, 29, 30, 71

(56) References Cited

U.S. PATENT DOCUMENTS

| | | | | |
|---|---|---|---|---|
| 956,789 A | * | 5/1910 | Allan ........................ | 137/540 |
| 2,248,850 A | * | 7/1941 | Campbell .................... | 137/107 |
| 2,279,002 A | * | 4/1942 | MacNeil ..................... | 137/540 |
| 2,593,103 A | * | 4/1952 | Casler ....................... | 137/107 |
| 2,908,288 A | * | 10/1959 | Carr et al. .................. | 137/540 |
| 2,979,069 A | * | 4/1961 | Valentine .................... | 137/102 |
| 2,985,490 A | * | 5/1961 | Gates ........................ | 137/102 |
| 3,183,042 A | * | 5/1965 | Bueler ....................... | 137/102 |
| 3,347,266 A | * | 10/1967 | Hausen ....................... | 137/540 |
| 3,476,142 A | * | 11/1969 | Schultz ...................... | 137/512 |
| 3,492,052 A | * | 1/1970 | Klimek ....................... | 134/102 |
| 3,653,721 A | * | 4/1972 | Klimek ....................... | 137/102 |
| 3,653,722 A | * | 4/1972 | Klimek ....................... | 137/102 |
| 3,744,507 A | * | 7/1973 | Oberthur ..................... | 137/107 |
| 3,769,997 A | * | 11/1973 | Hardwick et al. .............. | 137/102 |
| 3,866,623 A | * | 2/1975 | Klimek ....................... | 137/102 |
| 3,943,969 A | * | 3/1976 | Rubin et al. ................. | 137/540 |
| 4,002,374 A | * | 1/1977 | Horowitz ..................... | 137/102 |
| 4,019,525 A | * | 4/1977 | Horowitz ..................... | 137/107 |
| 4,037,879 A | * | 7/1977 | Horowitz ..................... | 137/102 |
| 4,132,241 A | * | 1/1979 | Iannelli ..................... | 137/512 |
| 4,438,980 A | * | 3/1984 | Lippiatt ..................... | 137/102 |
| 4,455,052 A | * | 6/1984 | Bueler ....................... | 303/9.66 |
| 4,577,653 A | * | 3/1986 | Marty ........................ | 137/454.2 |
| 5,653,256 A | * | 8/1997 | Myers et al. ................. | 137/454.2 |
| 5,752,541 A | * | 5/1998 | Gonzalez ..................... | 137/454.2 |

FOREIGN PATENT DOCUMENTS

FR  1100192  * 9/1955 ................. 137/102

* cited by examiner

*Primary Examiner*—George L. Walton
(74) *Attorney, Agent, or Firm*—Calfee, Halter & Griswold LLP

(57) ABSTRACT

A valve proportioning assembly that incorporates a check valve assembly is improved in manufacture and assembly. The valve proportioning assembly includes a housing having a blind opening that receives a sub-assembly of two separate non-metallic components that mate via an interference fit or snap-fit together enclose the check valve assembly. The non-metallic components enclose the check valve assembly. It includes a spring and spring follower so that a sub-assembly is formed for insertion into a blind bore. This minimizes potential misassembly, provides for a wider array of design configurations, and offers the additional advantage of adding more complete informational indicia directly into the molded components.

11 Claims, 3 Drawing Sheets

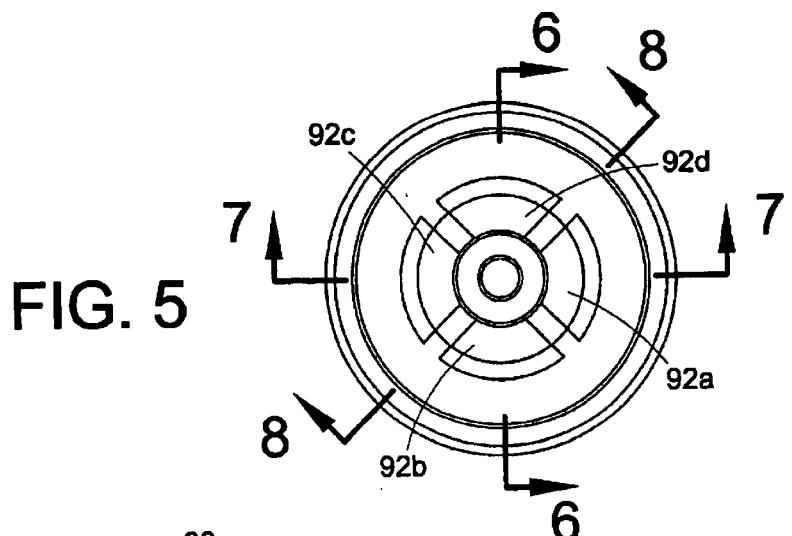
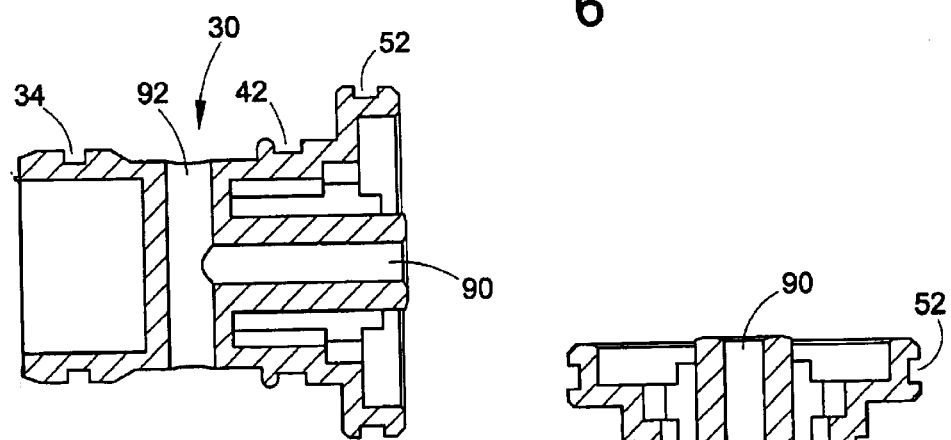
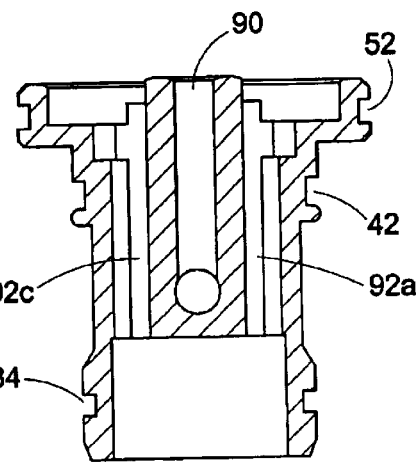
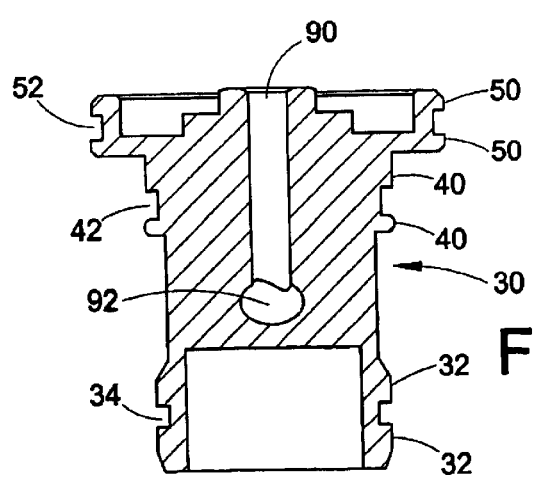
FIG. 5
FIG. 6
FIG. 7
FIG. 8

NON-METALLIC, SNAP-TOGETHER SUBASSEMBLY OF INTERNAL DOUBLE CHECK VALVE

BACKGROUND OF THE INVENTION

1. Field of the Invention

This invention generally pertains to an air brake system, and more particularly a proportioning valve incorporating a double check valve, as used in an air brake system. It will be appreciated, however, that the invention may have broader applications and may be advantageously employed in related valve environments or braking applications.

2. Description of Related Art

A conventional brake proportioning assembly includes a housing or body having a blind end bore that receives a valve assembly. In the prior art, a spring, a nylon disk/spring follower, and a check valve of the valve assembly are inserted and manually held in place. The subassembly is inserted into the blind bore of the housing. The individual parts or components of the valve assembly are inadequately controlled and maintained in the proper orientation. Often times, it is not until the assembled valve is subsequently subjected to a pneumatic test that assembly problems are noticed.

Moreover, air flow control through the valve assembly is restricted. The dimensioning of the metal valve element restricts the size and number of openings that could be formed from machining operations. Although complex passages can be machined into the metal valve member, such machining ultimately makes the valve manufacturing cost prohibitive and still may not achieve the desired increase in air flow or improved flow profiles.

With conventional metal valve assemblies, only a limited amount of identifying indicia is provided on the valve components. It is desirable, however, and a goal of effective quality control procedure, to convey or record an increased amount of information on the valve itself without substantially increasing the cost to manufacture the valve assembly.

SUMMARY OF THE INVENTION

The present invention provides a non-metallic, snap-together subassembly that eliminates potential operator assembly problems and improves the air flow and flow profiles through the valve assembly.

More particularly, the valve assembly includes a valve housing having a bore that receives the valve member therein. The valve member includes a first portion having internal passages formed therein. A second portion of the valve assembly is snap-fit, or interference fit, to the first portion. The first and second portions contain a check valve assembly that includes a spring, spring follower, and valve member.

The passages or openings in the first portion are enlarged to enhance air flow through the valve assembly.

A primary benefit of the invention resides in the ability to reliably assemble distinct, separate valve components.

Another benefit of the invention relates to the low cost associated with manufacture and assembly, while maintaining reliable performance.

Still another benefit of the invention resides in the increased information that may be provided on the valve for quality control purposes.

Still other features and benefits of the invention will become apparent to those skilled in the art upon a reading and understanding of the following detailed description.

BRIEF DESCRIPTION OF THE DRAWINGS

The invention may take physical form in various parts and arrangements of parts, a preferred embodiment of which will be described in detail in the specification. The drawings include:

FIG. 5 which is a plan view of a first end of the first valve portion;

FIG. 6 which is a cross-sectional view taken generally along the lines 6—6 of FIG. 5;

FIG. 7 which is a cross-sectional view taken generally along the lines 7—7 of FIG. 5; and FIG. 8 which is a cross-sectional view taken generally along the lines 8—8 of FIG. 5.

DETAILED DESCRIPTION OF THE PREFERRED EMBODIMENT

Figure 1:
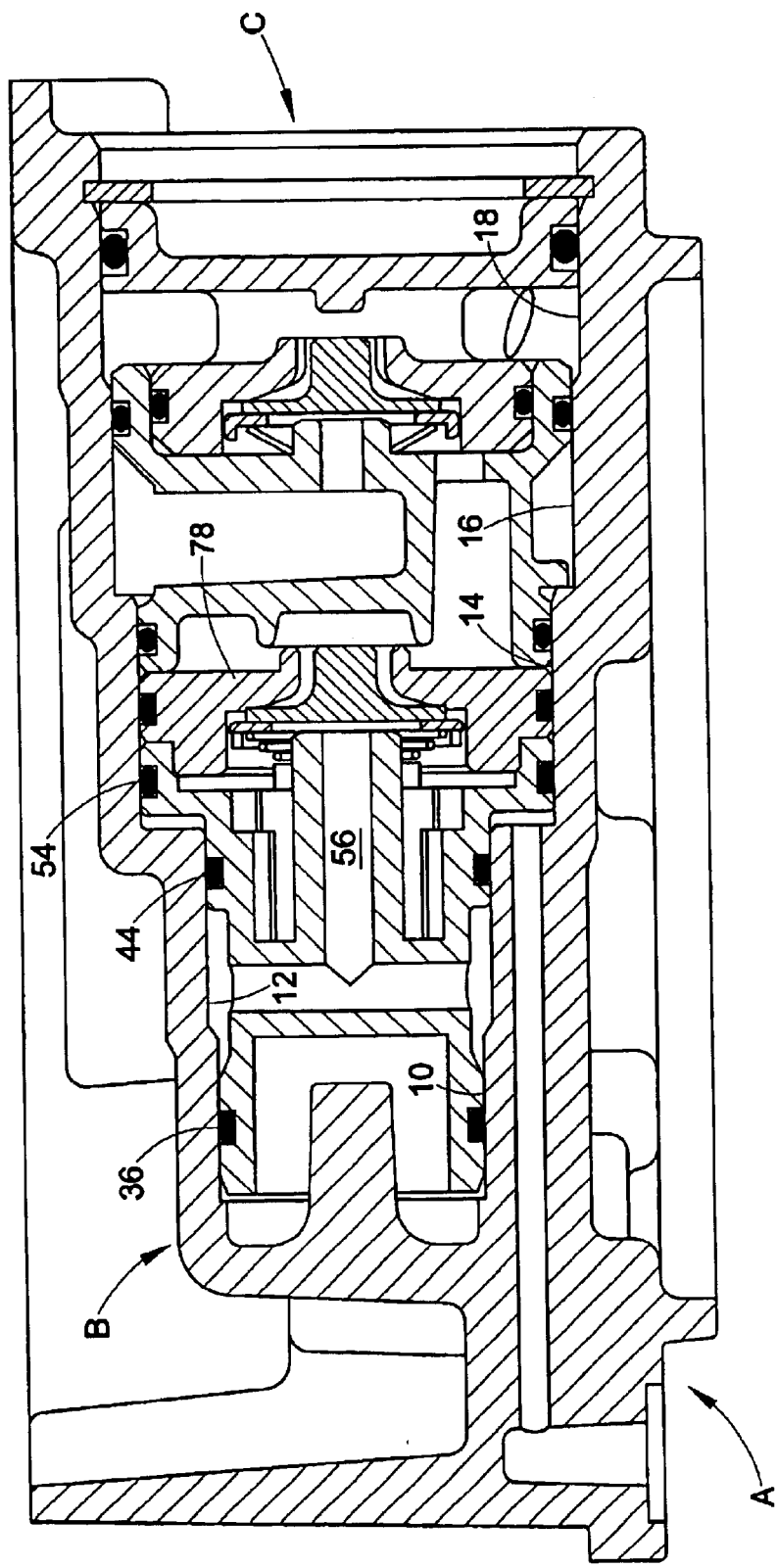
FIG. 1 which is a longitudinal, cross-sectional view through the valve assembly.

FIG. 1 illustrates a preferred embodiment of the present invention in which a valve A which includes a valve housing or body B and a valve assembly C. The preferred arrangement is a proportional valve employing a double check valve arrangement as used in a truck brake system (not shown). Since the truck brake system and the use of a proportioning valve employing the double check valve are well known in the industry, further discussion herein is deemed unnecessary to a full and complete understanding of the present invention.

This type of conventional housing or valve body has a blind ended passage or bore 10 with multiple counter-bores adapted to receive the valve assembly. In particular, the internal check valve arrangement requires an enlarged counter-bore assembly. Thus, and as shown in FIG. 1, the bore 10 has a first counter-bore 12 extending axially outward therefrom, and a second counter-bore 14 of slightly larger diameter extending axially outward from the first counter-bore. As will be appreciated, and as shown in this FIGURE, additional counter-bores 16, 18 can be provided to accommodate the remainder of the valve assembly.

Figure 2:
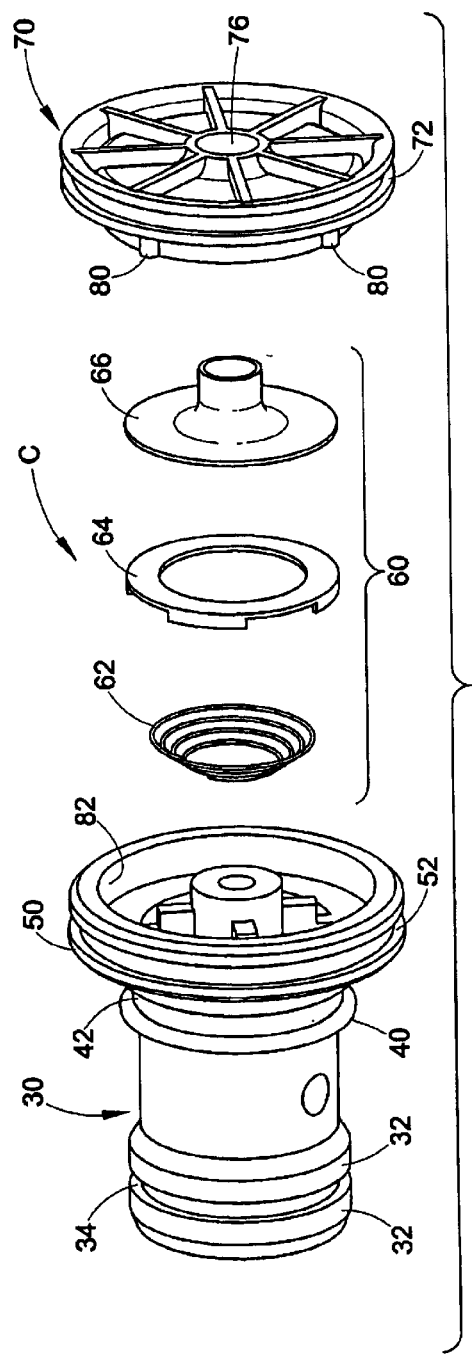
FIG. 2 which is an exploded perspective view of the five part subassembly in accordance with the present invention.
Figure 4:
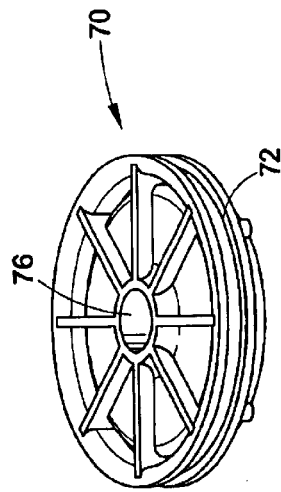
FIG. 4 which is a perspective view of the opposite end of the cap portion.
Figure 3:
FIG. 3 which is a perspective view of an underside of a second or cap portion of the valve assembly.

FIG. 2 is an exploded view of the valve assembly C removed from the housing. The valve assembly includes a first valve member portion 30 that is an elongated generally cylindrical structure. It has a pair of circumferentially continuous and radially raised lands 32 disposed adjacent a first end that define a groove 34 therebetween adapted to receive a first seal ring, such as O-ring 36. The O-ring is dimensioned for receipt in and adapted for sliding, sealing engagement with the bore 10. Similarly, lands 40 define a seal member receiving groove 42 that receives seal member or O-ring 44 that is dimensioned for sliding, sealing-engagement in the counter-bore 12 and, likewise, a third series of axially spaced lands 50 define a groove 52 that receives the O-ring 54 for sliding, sealing engagement in the counter-bore 14.

Internal passages 56 are formed in the first valve member portion 30. These passages communicate with a check-valve assembly 60, which is of generally conventional structure, to selectively prevent and allow air flow through the passages.

The check valve is best illustrated in FIG. 2 and includes three main components, including a biasing means or spring 62, a spring follower or spring locator 64, and an elastomeric or rubber valve member 66. The valve member 66 is adapted to selectively engage the open end of the passage 56 under the influence of air pressure. The air pressure overcomes the bias of the spring which prevents communication between the internal passages 56 and the remainder of the valve subassembly shown at the right-hand end of the valve assembly in FIG. 1.

The check valve assembly 60 is maintained in place by a second valve portion or cap 70. The cap is of annular configuration and on its external periphery includes a groove 72 that receives the sealing O-ring 74 that also slidably engages the counter-bore 14. A central or through passage 76 is defined through the cap to allow air flow to communicate with one face of the check valve member 66. Thus, and as best appreciated in FIG. 1, the cap has a peripheral dimension substantially identical to the second end of the first valve portion 30 so that when disposed in abutting relation with the first valve portion, the assembled valve portions 30, 70 are substantially similar in external profile to the prior art, conventional metal valve assembly.

Of importance in the present arrangement is a radial inner shoulder 78 that encloses or retains the check valve assembly 60 within the two-part valve member 30, 70. As referenced above, in the prior arrangement, the check valve assembly was inserted into the bore and counter-bore portion of the housing without any ability to assure retention. The present invention, however, assures that the cap portion 70 defines a friction fit with the first valve portion 30. This is achieved via radially raised protrusions 80 that form an interference fit with a counter-bore 82 in the enlarged end of the first valve portion. The spring 62, spring locator 64, and check valve 66 can be positioned within the first valve portion and over the right-hand end of the passage 56. Thereafter, the cap is brought into frictional engagement with the first valve portion via the cooperating surfaces 80, 82. In this manner, a discrete sub-assembly is formed outside of and prior to insertion into the first valve portion, and the assembler can be assured that the components will be retained in the proper relationship as the sub-assembly is inserted into the bore of the valve housing.

In the preferred arrangement, the first and second valve portions 30, 70 are formed from a plastic, such as a glass filled acetal. This is just one preferred non-metallic material because of its ability to withstand contaminants associated with an air brake system, such as brake fluid, hydrochloric acid, hydraulic fluids such as power steering fluids, etc. The prior art arrangement is not as desirable because of the costs associated with a machined metal valve that receives the check valve assembly, in addition to the handling and assembly difficulties noted above. The cap portion, disk, or similar closure member at the right-hand end of the valve assembly simply cannot be secured in an inexpensive manner to the remainder of the valve. By forming the valve portion from a plastic material, the components can be easily molded. Sidewall thicknesses can be closely controlled which results in closely controlled curing or cooling of the plastic upon removal from the mold so that warping, shrinking, and the like does not occur. The passages 56 extending through the valve portion can be non-circular (FIGS. 5–8) to increase air flow and also improve air flow profiles through the subassembly. For example, a central bore 56 intersects with cross bore 90. Both of these are illustrated as having circular cross-sections, although other cross-sectional configurations may be used without departing from the scope and intent of the present invention. On the other hand, longitudinal passages 92a–d are generally truncated pie-shaped portions that are evenly spaced in a circumferential direction. These passages can be substantially larger than conventional or traditional circular bores to improve air flow or delivery through the valve assembly. Although it is understood that machining a metal element could also achieve intricate passageways, the cost associated with such machining, and the complexity thereof, simply makes such options unacceptable from a manufacturing cost standpoint.

The non-metallic, moldable material also allows a wider range of informational indicia to be formed directly in the molded component. For example, the cavity number, date code, and part number associated with the particular valve can be easily formed in the component. This should be contrasted with the conventional aluminum parts where, although selected information may be available by stamping it on the component, the high cost of metal stamping essentially precluded the inclusion of anything but the most basic of information.

The O-rings 36, 44, 54 are received in the respective grooves and coated with a silicon grease before insertion into the blind opening. The two molded plastic parts serve as a less expensive replacement for the turned aluminum parts. Moreover, since the parts are molded, design features present themselves that were not otherwise commercially feasible with the metal. Uniform wall sections were used. This assures good plastic flow and is essential to minimizing porosity during curing of the material. Alignment pins are molded into the individual components so that the check valve member, spring, and spring follower could easily be captured within the cavity formed by the mating of the two plastic valve portions together. With a minimal force, the assembly is snapped together, ultimately creating a single sub-assembly from the individual five components. Once the seal rings are coated with the silicon greases the entire sub-assembly is simply inserted into the blind opening, and there is an increased assurance of guaranteeing a proper assembly.

The invention has been described with reference to the preferred embodiment. Obviously, modifications and alterations will occur to others upon a reading and understanding of this specification. It is intended to include all such modifications and alterations in so far as they come within the scope of the appended claims or the equivalents thereof.

Having thus described the invention, what is claimed is:

1. A valve assembly for an air brake system comprising:
   a valve housing having a blind bore and a counter-bore;
   a first valve member received in the blind bore having a first portion and a second portion forming an interference fit with the first portion; the first valve member comprising;
   a check valve assembly interposed between the first and second portions and maintained in an assembled state within the first and second portions, the check valve assembly including a biasing member, a follower, and a check valve member; and
   a second valve member received in the counter-bore of the valve housing, the first valve member and the second valve member in pneumatically operative communication with each other to provide a selected output from one of at least two pneumatic inputs.

2. A valve assembly for an air brake system comprising:
   a valve housing having a bore;
   a valve member received in the bore having a first portion and a second portion forming an interference fit with the first portion;

a check valve assembly interposed between the first and second portions and maintained in an assembled state within the first and second portions, the check valve assembly including a biasing member, a follower and a check valve member;

wherein the first portion includes a recess and the second portion includes protrusions extending therefrom and received in a friction fit engagement with the recess.

3. The valve assembly of claim 2 wherein the first portion of the valve member is formed from a non-metallic material.

4. The valve assembly of claim 2 wherein the second portion of the valve member is formed from a non-metallic material.

5. The valve assembly of claim 2 wherein the first portion of the valve member is formed from a non-metallic material and non-circular passages are provided therethrough to enhance flow.

6. A valve assembly comprising:

a housing having a blind ended bore formed therein and a counter-bore;

a first valve assembly dimensioned for receipt in the blind ended bore, the valve assembly including a first portion formed from a non-metallic material having at least one passage extending therethrough and having a recess formed at an open end thereof, and a second portion formed from a non-metallic material and including a surface dimensioned for interference fit with the recess, a check valve assembly received within the first and second portions including a spring, a spring follower, and a valve member disposed in abutting engagement within the first and second portions whereby the first valve assembly is maintained in assembled arrangement by the interference fit between the first and second portions allowing the first valve assembly to be easily inserted into the blind ended bore, and a second valve assembly received in the counter bore, the first valve assembly and the second valve assembly in pneumatically operative communication with each other.

7. A valve assembly comprising:

a housing having a blind opening formed therein;

a valve assembly dimensioned for receipt in the opening, the valve assembly including a first portion formed from a non-metallic material having at least one passage extending therethrough and having a recess formed at an open end thereof, and a second portion formed from a non-metallic material and including a surface dimensioned for interference fit with the recess, and a check valve assembly received within the first and second portions including a spring, a spring follower, and a valve member disposed in abutting engagement within the first and second portions whereby the valve assembly is maintained in assembled arrangement by the interference fit between the first and second portions allowing the valve assembly to be easily inserted into the blind opening; wherein the second portion includes raised protrusions disposed in spaced relation along the first portion for frictional engagement with the recess.

8. The assembly of claim 7 wherein the second portion includes a circumferentially continuous shoulder dimensioned for receipt in the recess.

9. A method of assembling a valve assembly, the method comprising the steps of:

providing a housing with a blind bore and associated opening therein;

providing a first non-metallic valve member portion having an open end defining a recess;

providing a second non-metallic valve member portion having a shoulder dimensioned for receipt in the recess of the first portion;

inserting a check valve assembly between the valve member first and second portions; and frictionally engaging the shoulder in the recess to encase the check valve member between the first and second valve member portions and define a sub-assembly, wherein the housing is adapted to receive the sub-assembly.

10. The method of claim 9 comprising the further step of sealingly inserting the sub-assembly into the blind bore in the housing.

11. The method of claim 9 including the steps of placing the check valve assembly into a cavity in the second valve member portion and advancing the first and second portions toward one another prior to the fictional engagement step.

* * * * *